US 7,353,494 B2

(12) United States Patent
Nielsen et al.

(10) Patent No.: US 7,353,494 B2
(45) Date of Patent: Apr. 1, 2008

(54) SYSTEM AND METHOD SUPPORTING CONFIGURABLE OBJECT DEFINITIONS

(75) Inventors: Morten Nielsen, Vedbaek (DK); Pavel Hruby, Naerum (DK); Lars Hammer, Frederiksberg (DK); Christian Vibe Scheller, Virum (DK)

(73) Assignee: Microsoft Corporation, Redmond, WA (US)

( * ) Notice: Subject to any disclaimer, the term of this patent is extended or adjusted under 35 U.S.C. 154(b) by 839 days.

(21) Appl. No.: 10/415,381

(22) PCT Filed: Oct. 26, 2001

(86) PCT No.: PCT/DK01/00712

§ 371 (c)(1),
(2), (4) Date: Dec. 12, 2003

(87) PCT Pub. No.: WO02/35351

PCT Pub. Date: May 2, 2002

(65) Prior Publication Data

US 2004/0093581 A1    May 13, 2004

(51) Int. Cl.
*G06F 9/44* (2006.01)
(52) U.S. Cl. ........................ 717/116; 717/120
(58) Field of Classification Search ............... 717/108, 717/116, 120, 1, 102, 140; 705/1, 30
See application file for complete search history.

(56) References Cited

U.S. PATENT DOCUMENTS

| 5,515,508 A | 5/1996 | Pettus et al. |
| 5,734,837 A | 3/1998 | Flores et al. ................... 705/7 |
| 5,768,506 A | 6/1998 | Randell ....................... 709/202 |
| 5,768,586 A | 6/1998 | Zweben et al. ............. 713/100 |
| 5,822,580 A | 10/1998 | Leung |
| 5,848,273 A | 12/1998 | Fontana et al. ............. 717/108 |
| 5,913,063 A | 6/1999 | McGurrin et al. .......... 717/109 |
| 5,956,508 A | 9/1999 | McKelley, Jr. et al. |
| 6,044,354 A | 3/2000 | Asplen, Jr. .................... 705/7 |

(Continued)

FOREIGN PATENT DOCUMENTS

WO    WO 00/67186    11/2000

OTHER PUBLICATIONS

"A Process-Driven, Event-Based Business Object Model", K. Riemer, Object Management Group, Nov. 4, 1997.

(Continued)

*Primary Examiner*—Meng-Al T. An
*Assistant Examiner*—Mark P. Francis
(74) *Attorney, Agent, or Firm*—Joseph R. Kelly; Westman, Champlin & Kelly, P.A.

(57) ABSTRACT

The present invention discloses a system and method supporting high-level configuration of Business Object Types during development of an application. More specifically an application developer is supported with predefined pieces of functionality and meta-data, so called Aspect Types, during the configuration of Business Object Types. An Aspect Type may operate across one or more Business Object Types depending on the functionality of the Aspect Type, e.g. an Aspect Type "Relation" Aspect Type comprises functionality that provides for connection between two or more Business Objects. The functionality comprised in an Aspect Type may be configured with an Event Type so runtime an Event Instance of the Event Type may be triggered either by the functionality of the configured Aspect Type or by e.g. a user of the application.

8 Claims, 9 Drawing Sheets

U.S. PATENT DOCUMENTS

| | | | | |
|---|---|---|---|---|
| 6,058,416 | A | | 5/2000 | Mukherjee et al. ......... 709/203 |
| 6,134,706 | A | * | 10/2000 | Carey et al. ................. 717/102 |
| 6,158,044 | A | | 12/2000 | Tibbetts ...................... 717/100 |
| 6,230,309 | B1 | | 5/2001 | Turner et al. ................ 717/107 |
| 6,233,537 | B1 | | 5/2001 | Gryphon et al. ............... 703/1 |
| 6,434,568 | B1 | | 8/2002 | Bowman-Amuah ..... 707/103 R |
| 2001/0007976 | A1 | | 7/2001 | Thompson et al. ............. 705/7 |
| 2001/0009033 | A1 | * | 7/2001 | Morisaki et al. ................ 717/1 |
| 2002/0019971 | A1 | | 2/2002 | Zygmont et al. .............. 717/1 |
| 2002/0091680 | A1 | | 7/2002 | Hatzis et al. .................. 707/3 |
| 2002/0092004 | A1 | * | 7/2002 | Lee et al. .................... 717/140 |
| 2003/0163329 | A1 | * | 8/2003 | Bolene ......................... 705/1 |
| 2006/0161507 | A1 | | 7/2006 | Reisman ..................... 706/12 |
| 2006/0178960 | A1 | * | 8/2006 | Lepman ....................... 705/30 |

OTHER PUBLICATIONS http://www.parc.xerox.com/csl/projects/aop/. APO team consists of Gregor Kiczales, John Lamping, Crista Lopes, Jim Hugunin and Mik Kersten.

http://www.parc.xerox.com/csl/projects/aop/faq.shtml. AOP team consists of Gregor Kiczales, John Lamping, Crista Lopes, Jim Hugunin and Mik Kersten.

http://www.parc.xerox.com/csl/projects/aop/selectedPapers.shtml. AOP team consists of Gregor Kiczales, John Lamping, Crista Lopes, Jim Hugunin.

http://www.reasearch.ibm.com/sop/sopoverv.htm.

http://www.reasearch.ibm.com/sop/sopdpats.htm.

http://www.reasearch.ibm.com/sop.

http://www.reasearch.ibm.com/sop/sopprob.htm.

http://www.reasearch.ibm.com/sop/sopencap.htm.

http://www.reasearch.ibm.com/sop/sopmulti.htm.

http://www.reasearch.ibm.com/sop/support.htm.

http://www.reasearch.ibm.com/sop/suppubs.htm.

* cited by examiner

SYSTEM AND METHOD SUPPORTING CONFIGURABLE OBJECT DEFINITIONS

CROSS-REFERENCE TO RELATED APPLICATION

This Application is a Section 371 National Stage Application of International Application No. PCT/DK01/00712, filed Oct. 26, 2001 and published as WO 02/35351 on May 2, 2002, in English, which claims priority on U.S. Ser. No. 09/696,020, filed Oct. 26, 2000 now abandoned.

FIELD OF THE INVENTION

The present invention relates to a system and method supporting the configuration of Business Object Types, more specifically, supporting the use of predefined pieces of functionality and meta-data in the configuration of Business Object Types.

BACKGROUND

When programming extensive computer applications with a high complexity as well as a high flexibility there is a wish to factor out common functionality. Functionality is commonly reused on a "cut and paste" basis and it is difficult to interface between the different constituent components because there is no clear encapsulation of functionality and separation of data and methods. This leads to inconsistencies and low quality, because a reused piece of functionality has no intelligence—it does not know where it came from, and does not synchronize automatically with its progenitor. Furthermore, maintenance is laborious, because the same functionality is repeated, maybe with slight variants, in a lot of places. It takes time to identify all places where an update is required, and the process requires manual intervention and is therefore error-prone.

A way to overcome some of these problems is to use Object Oriented programming. In Object Oriented programming:

Reuse is controlled, as common functionality can be factored out into objects with well-defined interfaces.

Interoperability is facilitated, because objects have well-defined and well-described interfaces.

Variance can be controlled by use of inheritance. Inheritance makes sure that any change to the progenitor will be applied to its descendants.

The level of abstraction is supposedly heightened, as objects should ideally be rooted in the business problem domain, not in the "computer" domain.

Still, extending a solution can be a bottleneck, because the programmer is responsible for the infrastructure without which there is no application A more structured way of using Object Oriented programming can be provided in a framework. An advantage of a "framework" for application development is that the common functionality is provided in the framework, not in libraries or utility classes. The framework, basically, becomes a framework by providing common functionality plus setting the infrastructure of a working program. However also this kind of programming is also based on inheritance and cannot be easily upgraded.

Within the last couple of years several attempts of creating a framework-based programming language that organizes the programming code for the programmer have been suggested. The overall idea by introducing this programming technique is that all Objects are based on predefined pieces of code. Among others are "Subject-Oriented Programming" by IBM and "Aspect-Oriented Programming" by Xerox PARC Software.

Even though this way of programming helps the programmer organize the objects, the programmer is still responsible for describing how these pieces of functionality interact by writing code from scratch, and writing how these pieces of functionality are combined. This process is also known as "weaving".

It is a disadvantage of these framework-based programming languages that basically all the weaving has to be redone or at least checked every time the pieces of functionality change. This makes upgrading the framework complicated and expensive.

Furthermore, since some functionality of an object will be provided in the weaving code, it is impossible for the framework to guarantee a system-wide quality of the application, because the framework has no way of knowing what the weaving code does.

DESCRIPTION

It is an object of the invention to:

make it easy to create and customize applications, make it easy to up-grade the common functionality without having to rewrite the applications, and control the quality of the applications In a broad first aspect of the invention a system for configuring a Business Object Type is provided, said system comprising a design component for configuring the Business Object Type, the design component having access to or being provided with; Business Object Type connecting means, a set of Aspect Patterns wherein at least one of said Aspect Patterns comprises: Aspect connecting means, one or more pieces of generalized functionality; wherein the pieces of generalized functionality are adapted to be specified, thereby providing pieces of specific functionality, and one or more Aspect Event Type connecting means enabling that one or more pieces of functionality can be triggered, a set of Event Types, wherein at least one of said Event Types comprises Event Type connecting means.

It is an advantage of the invention that Business Object Types more easily can be created by configuring the predefined pieces of functionality in the one or more Aspect Patterns, configuring the Business Object Type with the one or more Aspect Patterns, configuring the one or more Event Types with the Business Object Types and configuring the Event Types with one or more pieces of functionality in the one or more Aspect Patterns thereby enabling one or more pieces of functionality to be triggered in the Aspect Patterns. It is a further advantage of the invention that before the configuration there does not exist any connections between the Aspect Patterns and the Business Object Type, the Event Types and the Business Object Type. Neither does any of the Aspect Patterns have any mutual connections before the configuration This is an advantage since it facilitates upgrades of the system. Furthermore, the level of abstraction is higher compared to traditional configuration thus supporting faster modeling and higher quality of an application.

In the following, a number of technical terms are used. The use of these terms is believed not to be in contradiction with the ordinary use of the terms, but in order to ease the understanding of the invention, a short list of some terms are given below together with an indication of the meaning of these words:

Meta-data (synonyms: type data, $2^{nd}$ order data): Data that is related to the type of data instead of to the data itself. For example a postal address may comprise the elements: street, number, zip, city and country. The information about which elements a postal address comprises is meta-data. Another example is that in a given system it is defined that the name of an employee can consist of no more than 50 characters. The maximum allowed number of characters is meta-data.

$1^{st}$ order data on the other hand describe specific things that apply only to instances: the actual postal address (Frydenlunds allé 6, 2950 Vedbaek), the actual Employee Name (Lars Hansen) or the actual engine number (S/N 45 55 666). It is implied that data must always behave according to the specifications laid down in its meta-data. For example the Employee Name will have to comply with the rule that the number of characters does not exceed 50.

A configuration is a complete or partial specification of one or more pieces of generalized functionality and/or meta-data.

An Aspect Pattern is a kind of extended data type, in the sense that it represents a configurable solution to a general problem, and in the sense that it comprises business logic for the solution of the general problem. An Aspect Pattern comprises one or more generalized pieces of functionality. An Aspect Pattern further defines a set of meta-data that can be configured for that pattern. The Aspect Pattern defines the interpretation of a number of meta-data in an application. An Aspect Pattern further comprises Aspect connecting means and Aspect Event Type connecting means.

For example, an application may use an "Address Aspect Pattern" as well as a "Milestone Aspect Pattern". The Address Aspect Pattern may comprise e.g., one or more pieces of functionality that knows how to handle a telephone address e.g., it comprises functionality that knows how to: call a telephone number, verify the number against the national telephone register, format the number for output, etc. The Address Aspect Pattern may also comprise one or more pieces of functionality that knows how to handle a postal address including e.g., a piece of functionality that can verify the address. All Aspect Patterns require broad interpretations to ensure that all problems that can be solved by the functionality of a particular Aspect Pattern also belong to this pattern. For example, the Value Aspect Pattern may be used to calculate various values on the basis of other values or to estimate costs. By value is meant traditional values such as price, VAT and discount, but also more abstract values such as working hours.

An Aspect Pattern comprises one or more Aspect Types. An Aspect Type is a specification of the Aspect Pattern. Therefore, for the various Aspect Types it is decided which pieces of functionality the Aspect Type may use and to some extent how Each Aspect Type may define the meta-data of the 1st order data at runtime.

For example, an application that uses the "Address Aspect Pattern", as explained above, may further use some specifications of the "Address Aspect Pattern" e.g. an Aspect Type "Home address" and an Aspect Type "Bill to address". For each Address type, the functionality within the Address Aspect Pattern is specified in greater detail. The Address Type "Home address" may for example, be defined so that it can use only the "postal address" piece of functionality within the Address Aspect Pattern, whereas the Aspect Type "Bill to address" can use either the "Postal Address" or the "E-mail address" pieces of functionality. That is, pieces of functionality are configured in an Aspect Type, e.g. the Address Type "Home address" is configured to only encompass the "postal address" functionality. For an Identification Aspect Pattern comprising functionality that enables automatic creation of an identifier, an Aspect Type could be specified in what way the identifier shall be created e.g. whether the identifier uses numbers that are created from a number series or a random number generator.

Business Object Type: A Business Object Type is an object type that represents a concept or type of entity within the scope of the real world. Typical examples of Business Object Types are: Employee, product, invoice, payment, debtor, creditor, and orders. A Business Object Type comprises Business Object Type connecting means.

By connecting one or more Aspect Types with a Business Object Type a Configured Business Object Type with one or more configured Aspect Types is created. That is, the Aspect Type's Aspect connecting means are connected with the Business Object Type connecting means.

For example in an application a Business Object Type "Customer" may need a home address, hence, the Aspect Type "Home address" must be configured with the Business Object Type "Customer". In this way a configured Business Object Type "Customer" is obtained. The Configured Aspect Type will then be the "Customer's Home address".

A Business Object Instance is an instance of the configured Business Object Type. For example, a Business Object Instance of the configured Business Object Type "Customer" could be Naivision Software A/S.

An Aspect Instance is one or more $1^{st}$ order data of a Configured Aspect Type created at runtime. For example, the "Home Address for a specific Customer" may be "Frydenlunds Allé 6, 2950 Vedbaek".

In the following the correspondence between Object Oriented Programming (OOP) and the invention is explained. In OOP a Class may comprise a set of meta-data and/or one or more pieces of functionality that may operate on either one or more Object Instances or on all of the Object Instances within the class. In the present invention a Configured Business Object Type corresponds to the same level of abstraction as a Class in the sense that it may comprise one or more Business Object Instances. A Configured Aspect Type could then be conceived as corresponding to one or more of the pieces of functionality as well as a part of meta-data for a Class.

A Business Object Alias expresses the same physical entity of two or more different Business Object Instances (e.g. a company that is acting as both a customer and a vendor, i.e. different Business Object Types. can be configured to be possible aliased so that Aspect Instances instantiated from the same Aspect Types in the different Business Object Types will be the same. This implies that a change in one Aspect Instance in a first Business Object Instance automatically will be propagated to other matching Aspect Instances of other Business Object Instance that have been specified to be aliased will the first Business Object Instance. For example, the Business Object Instances of the Business Object Type "Customer" as well as the Business Object Instances of the Business Object Type "Vendor" may be aliased. If the Business Object Type Customer as well as the Business Object Vendor comprise the Aspect Type "home address" and a Business Object Instance of "Customer" has been specified as aliased with a Business Object Instance of "Vendor", a change in the Aspect Instance of the "home address" in either of the Business Object Instances will be propagated to the other.

An application comprises a number of configured Business Object Types. An outline of the principle of the model of configuring is illustrated the FIG. 1. The model should be interpreted in the following way.

An Event Type is configured with a configured Business Object Type and defines possible occurrences to which an Aspect Pattern may react. An Event Type comprises Event Type connecting means. Either a user or the system can trigger an Event Type to firing an Event Instance. An Event Instance is an occurrence of an Event Type. An Event Type may be fired zero or a number of times. The actual communication between the Aspect Instances is carried out through Event Instances. The Event Types are configured with the specific Business Object Types. Thus, the Event Types control the dynamics of the Business Object Types. E.g. an Event Type for the Business Object Type "Invoice" could be "payment due" and an Event Instance thereof would then be triggered by a piece of functionality within the Aspect Pattern that has been configured with the "payment due" Event Type the actual date a Business Object Instance (i.e. a specific Invoice) has payment due. Also, an Address Aspect Pattern may have a piece of functionality that enables checking of a postal address in an official register It is then possible to create an Event Type that triggers the piece of functionality that checks the postal address in an official register. An Event Type for the configured Business Object Type "Customer" could then be "Address verification", and it would trigger the postal address check. The "Address verification" Event Type can then be configured to be either a system triggered Event Type or a user triggered Event Type.

The business logic i.e. the functionality of an Aspect Pattern can take action when an Aspect Instance of the Aspect Pattern receives a specific Event Instance. The event mechanism serves to fully insulate Aspect Types: we say that the Aspect Types preferably are disjoint, which means that the single Aspect Type does not know about the data or logic of any of the other Aspect Types, or even if another Aspect Type exists. Likewise also the Aspect Patterns are preferably disjoint. This is an advantage since it provides for plugging a new Aspect Pattern into a running system without having to make any other changes to the system than those regarding the new Aspect Pattern and its Aspect Types thus facilitating upgrades by eliminating the possible side effects, since none of the other Aspect Types have to be reconfigured.

For example, it will be a user of the application that fires an Event Instance of the Event Type "Address verification", configured as a user triggered Event Type. When the Event Instance is fired, it will then trigger the postal address check in the Address Aspect Pattern. Hence, neither an Event Type nor an Event Instance has any functionality. They solely comprise information about which Configured Aspect Types they may trigger by the configuration of the Event Type connecting means, thus triggering the functionality in the Aspect Pattern of the Configured Aspect Type, as illustrated in FIG. 1.

In order to ease reading of the following an outline of the principle of the model of configuring a Business Object Type according to the present invention is shown in FIG. 1. It appears from the figure that for each Aspect Pattern one or more Aspect Types may exist As explained earlier, an Aspect Type is a specification of an Aspect Pattern. The specified piece(s) of functionality that should be executed when an Event Type is triggered comprises Aspect Event Type connecting means. In a preferred embodiment of the invention the Aspect Event Type connecting means and the Event Type connecting means each comprises a unique Aspect Event Type ID respectively a unique Event Type ID. Setting the Event Type ID and identifying which pieces of specified functionality within one or more Aspect Types (comprised in one or more Aspect Patterns) that should react when the Event Type is triggered then configures the effect of an Event Type. Arrows in between the Event Type connecting means and the Aspect Event Type connecting means thus indicate the configuration. The Aspect Event Types IDs that correspond to these pieces of specified functionality are then set to the same as the Event Type ID. For example, a "Postal address" Aspect Type comprises a piece of "verification" functionality that should be triggered when an Event Type "Create customer" with an Event Type ID e.g. "1" is triggered, thus the Aspect Event Type ID that is comprised in the "verification" piece of functionality should also be "1". Other pieces of functionality within the "Postal address" and/or other Aspect Types may also need to be triggered, thus their Aspect Event Type IDs should also be "1". The actual configuration of a Business Object Type is carried out by joining the Business Object Type connecting means with the Aspect connecting means and the Event Type connecting means. In a preferred embodiment of the invention the Business Object Type connecting means and the Aspect connecting means each comprises a Business Object Type ID respectively Aspect ID, the configuration of a Business Object Type is then carried out by creating an entry with the Business Object Type ID, the one or more Aspect IDs and the one or more Event Type IDs in e.g. a Database as shown in FIG. 4. The arrows in FIG. 1 between the Aspect connecting means and the Business Object connecting means and the arrows between the Business Object Type and the Event Types indicate a configuration.

In FIG. 1 the configuration of only one Business Object Type is illustrated, though a number of Business Object Types can actually be configured in a corresponding way: by using the same Aspect Pattern and their Aspect Types.

In order to make two or more Business Object Instances interact a "Relation" Asp ct Pattern is implemented in a preferred embodiment of the invention. In addition to the Aspect connecting means the "Relation" Aspect Pattern further comprises related relation connecting means (related relation type IDs) that can be configured to one or more (relation) Aspect connecting means thereby creating a connection between the Business Object Types. The "Relation" Aspect Pattern further comprises one or more pieces of functionality that may react when a Business Object Instance receives an Event Instance and one or more pieces of functionality that enables it to propagate another Event Instance to a related Business Object Instance. For example, if a technician should be allocated to a service job, a Business Object Type "Employee" should be related with the Business Object Type "Service Job" by configuring the "Relation" Aspect Pattern with both Business Object Types. Thus, a Business Object Instance "Kim Jensen" of the Business Object Type "Employee" can be related with the Business Object Instance "SJ334455" of an Aspect Type "SJ" with an Aspect Instance of the configured "Relation" Aspect pattern. Whenever an Event Instance is fired on one of the Business Object Instances another Event Instance will be propagated to the other Business Object Instance.

In order to illustrate the crosscutting nature of an Aspect Pattern an example of a configuration of a single Aspect Pattern with a number of Business Object Types is presented in the following: Lets say that in an application it must be possible to keep track of sold items, bought items as well as the number of items on stock. In order to configure such an application an Aspect Pattern "Registration" comprising functionality that makes it possible to keep track on the number of items, the sold items as well as the bought items may be used. For example a Business Object Type "Good" as well as a Business Object Type "Delivery" and a Business Object Type "Shipment" may be configured with the "Registration" Aspect Pattern. The "Registration" Aspect Pattern may comprise the meta-data: "amount", "+/−" and "total" where "amount" is an amount of the item that is dealt with "+/−" indicates whether the "amount" should be subtracted or summed up when the total should be found laid out in the meta-data "total". Further more, the meta-data "total" in the "Registration" Aspect Pattern could be associated with a piece of functionality that provides for a sum of zero or more Aspect Instances derived from a configuration of one or more Business Object Types comprising the Aspect Pattern "Registration" comprising the meta-data "amount" and "+/−". In the example the Business Object Type "Shipment" should be configured with the meta-data "amount" and "+/−" comprised in the "Registration" Aspect Pattern where "amount" is the number of sold items and "+/−" should be configured as "−" since the amount should be subtracted in the "total" amount of the "Registration" Aspect Pattern configured with the Business Object Type "Good". Further the Business Object Type "Delivery" should also be configured with the meta-data "amount" and "+/−" of the "Registration" Aspect Pattern. The meta-data "+/−" should be configured as "+" for the Business Object Type "Delivery" indicating that the number of items is increased every time a delivery takes place. An embodiment as the one laid out in the example is illustrated in the following Table.

| Business Object Type | | Good | Delivery | Shipment |
|---|---|---|---|---|
| Aspect Pattern "Registration" | total | x | | |
| | amount | | x | x |
| | +/− | | + | − |

It may be useful in some situations to retrieve a value from an Aspect Instance of one Configured Aspect Type and set the value on another Aspect Instance of a Configured Aspect Type. This is achieved by configuring a "Propagated Value" to a Business Object Type. The configured Aspect Type where the Aspect Instance should be looked up and the configured Aspect Type where the Aspect Instance should be changed is specified during configuration. An Aspect Pattern that can provide one or more values from its Aspect Instances comprises a piece of Expression functionality. The expression functionality provides for a specification of what part of the Aspect Instance that should be propagated. An Aspect Pattern that can set one or more values on its Aspect Instances comprises a piece of channel functionality. The channel functionality provides for a specification of what part of the Aspect Instance that should be changed. The Propagated Value comprises Source Aspect connecting means and Target Aspect connecting means. To ensure that all values are up-to-date, all Propagated Values are calculated when the Source changes.

During configuration of Propagated Values as illustrated in FIG. 2 a Business Object Type is configured with zero or a number of Propagated Values. For each of the Propagated Values the Source Aspect connecting means is connected with an Aspect Connecting means of the Aspect Type that the Value should be retrieved from. Likewise the Target Aspect Connecting means is connected with an Aspect connecting means of the Aspect Type that the Value should be set on. The Aspect Types that the Source Aspect connecting means respectively the Target Aspect connecting means are configured with may be configured with the same Business Object Type or different Business Object Types. Thus, by using Propagated Values, values can be exchanged within a Business Object Instance as well as between two Business Object Instances. In a preferred embodiment of the invention the Source Aspect connecting means as well as the Target Aspect Connecting means each comprises a unique identifier, also as explained earlier the Aspect connecting means as well as the Business Object Type connecting means also comprises a unique identifier. The configuration is then carried out by creating an entry that comprises the Business Object ID, the Source Aspect ID, which is set to the same ID as the Aspect Type that it should retrieve the value from, and the Target Aspect ID, which is set to the same ID as the Aspect Type that it should set the value on. Also in the propagated value it is specified what part of an Aspect Instance where the value should be retrieved respectively set.

For example, if the price of a service order should depend on the response time of the service order, so that a "short", "medium", and "long" response time would result in different prices, a Business Object Type "Service Order" may be configured with a "Response Time" Aspect Type comprising the response time of the service order, and a "Price" Aspect Type comprising the price of the service order. Whenever the response time of the service order in a "Response Time" Aspect Instance is changed the price of the service order in the corresponding "Price" Aspect Instance should be recalculated based on the response time. This could be done by having an expression on the "Response Time"—Aspect Type called "Length" that may return one of the values "long", "short" or "medium". It would be part of the "Response Time"—Aspect Type's configuration that would determine whether the response time of the service order in the "Response Time" Aspect Instance is considered "long", "short" or "medium". The "Price"—Aspect Type could have a channel called "Quality of Service" that could receive any of the values "long", "short" or "medium". Based on the input, the "Price" Aspect Type would recalculate the "Price" Aspect Instance according to the functionality in its Aspect Pattern and its configuration. The Propagated Value-mechanism would be responsible for passing the value from the "Response time" Aspect Instance to the "Price" Aspect Instance.

In addition to using the Propagated Value mechanism for propagating values between Aspect Instances another mechanism called the Rule-mechanism may also be used. The Rule-mechanism is based on expressions as described above but instead of pushing values actively between the Aspect Instances the expression is only calculated when the Aspect Instance needs the value. The rules are expressions that are stored within and handled by the configured Aspect Patterns. The rule mechanism is typically preferred over the Propagated Value-mechanism when pushing the value is costly. For example, a Business Object may be configured with an "Address" Aspect Pattern and a "Price" Aspect Pattern. When a "Price" Aspect Instance receives an Event Instance of the "prepare invoice" Event Type, it needs to know the distance from the head office to the address given in the "address" Aspect Instance in order to calculate the price. Only at the time when the "price" Aspect Instance receives the Event Instance of the "prepare invoice" Event Type will it invoke its rule and retrieve the "distance" expression of the "address" Aspect Pattern. While this mechanism will result in the "price" Aspect Instance having an undefined value until the time of receiving the Event Instance of the "prepare invoice" Event Type it will on the other hand prevent the potentially costly distance calculation from taking place unless it is really needed.

A rule may be configured with an Aspect Pattern. A rule comprises one or more Rule Source connecting means. The rule further comprises an expression for calculating a value based on other values on the same or other Aspect Instances. The Rule Source connecting means comprises information of where the values that the calculation should be based on should be found.

In an embodiment of the invention the set of Aspect Patterns comprises a Relation Aspect Pattern, the Relation Aspect Pattern comprising: Aspect connecting means, one or more pieces of generalized functionality; wherein the pieces of generalized functionality are adapted to be specified, thereby providing pieces of specific functionality, a related relation Aspect connecting means, and one or more Aspect Event Type connecting means enabling that one or more pieces of functionality can be triggered. It is an advantage of the invention that connections between one or more Business Object Types may be created by configuring a relation Aspect Pattern. In this way all relations between Business Object Types and consequently also all their Business Object Instances may be handled in the same way because the relation Aspect Pattern only has to be implemented once, thereby providing less code and a more robust system. It is a further advantage that all relations between Business Object Types are configured in the same way for the application developer.

In a preferred embodiment of the invention a system is provided wherein the set of Aspect Patterns further comprises a plurality of Aspect Patterns each of said Aspect Patterns comprising one or more pieces of generalized functionality; wherein the pieces of generalized functionality are adapted to be specified, thereby providing pieces of specific functionality, Aspect connecting means, one or more Aspect Event Type connecting means enabling that one or more pieces of functionality can be triggered. By providing a plurality of Aspect Patterns the application developer is provided with more predefined functionality, thus facilitating the actual configuration of applications.

Preferably, a plurality of the Aspect Patterns in the set of Aspect Patterns comprises meta-data. In this way connections between functionality and meta-data within an Aspect Pattern may be provided. This provides for the functionality within an Aspect Pattern to be specified when configuring by only specifying and/or adding meta-data.

Furthermore, the at least one Aspect Pattern may preferably comprise an Aspect Interface. Preferable a plurality of Aspect Patterns in the set of Aspect Patterns comprise the Aspect Interface. This is an advantage since a new Aspect Pattern easily can be added to the set of Aspect Patterns as long as it comprises the same Aspect Interface.

In the preferred embodiment or other embodiments of the invention a system, the design component further has preferably access to or is preferably provided with source Aspect connecting means and target Aspect connecting means and the set of Aspect Patterns further comprises preferably: one or more Aspect Patterns comprising, a piece of Expression functionality, one or more Aspect Patterns comprising: a piece of Channel functionality thereby providing exchange of values between Aspect Instances. This is an advantage since it ensures that all values that have been configured in this way are updated whenever a change in the source Value happens. Also, it is an advantage that an Aspect Instance may retrieve values in other Aspect Instances and still keep the Aspect Instances as well as the Aspect Types and the Aspect Patterns loosely coupled.

In particular valuable embodiments of the invention a system in which the set of Aspect Patterns further comprises one or more Aspect Patterns comprising Rule Source connecting means is provided. It is an advantage to use a rule (or rules) in cases when e.g. the number of values that should be retrieved in order to calculate the expression is high and in cases when there is no reason for updating the value in the Aspect Instance before it should be used.

In preferred embodiments of the invention a system is provided in which the design component is used for or designed to be used for configuring a plurality of Business Object Types. It is an advantage to configure a plurality of Business Object Types by using the same set of Aspect Patterns since it facilitates upgrades of the system.

Also within the scope of the invention is a system wherein at least one Aspect Pattern within the set of Aspect Patterns comprises; one or more Aspect Types each Aspect Type being a specification of the Aspect Pattern. In this way the application developer may be provided with one or more partial configurations of one or more Aspect Patterns thus facilitating the configuration for the application developer. Preferably a system wherein the Aspect Types are designed to be configured with one or more Business Object Types is provided. This is an advantage since it provides for reuse of Aspect Types between Business Object Types.

In preferred embodiments of the invention a system is provided wherein the Business Object Type connecting means comprises an identifier, BOTID, uniquely identifying the Business Object Type is provided. It is also within the scope of the invention to provide a system wherein the Aspect connecting means comprises an identifier, ATID, uniquely identifying the at least one Aspect Pattern and a system, wherein the Aspect Event Type connecting means comprises an identifier, $(A_1ETID_1\ A_1ETID_2, \ldots, A_NETID_1, A_NETID_2)$, uniquely identifying the one or more pieces of functionality that can be triggered in said Aspect Pattern. It is a further scope of the invention to provide a system wherein the Event Type connecting means comprises an identification number, ETID, uniquely identifying the Event Type. It is an advantage to use identification numbers, IDs, when the actual configuration of an application is implemented in e.g. a relational database.

Also within the scope of the invention are systems wherein the Event Type can be user fired. In this way a user may initiate one or more pieces of functionality within one or more Aspect Patterns to be executed. Also, within the scope of the invention are systems wherein the Event Type can be fired by a piece of functionality within the Aspect Pattern it is configured with. This is an advantage since the system may initiate one or more pieces of functionality within one or more Aspect Patterns to be executed. By configuring Event Types as user fired or system fired or both it is possible to control what pieces of functionality that may be triggered by the user, the system or both.

It preferred embodiments of the invention a system is provided wherein the design component further has access to or is provided with a set of pre-configured Business Object Types. The preconfigured Business Object Types may advantageously be configured with one or more Aspect Patterns that have been complete or partial configured, one or more Aspect Types that have been complete or partial configured, one or more Event Types that the Business Object Type may react on, one or more configurations of Event functionality within the one or more Aspect Patterns or the one or more Aspect Types. In addition a pre-configured Business Object type may be configured with one or more default values or rules. This is advantageously since the application developer does not need to configure the application from scratch.

In addition, within the scope of the invention are systems wherein the design component has access to or further comprises a repository component comprising meta-data of the application. Thereby the design component comprises the actual configuration of an application.

In a second aspect the present invention relates to a repository for an application in which a Business Object Type is based on at least one configured Aspect Pattern, said repository comprising one or more entries of configured Business Object Types each entry comprising a Configured Business Object Type ID (BOTID) uniquely defining the configured Business Object Type; one or more entries of configured Aspect Patterns each entry comprising the BOTID and a configured Aspect Type ID (ATID) uniquely defining the configured Aspect Pattern, one or more entries of the configured Aspect Pattern each entry comprising the ATID and meta-data specifying the configuration of the Aspect Pattern, one or more entries of configured Event Types each entry comprising the BOTID and an Event Type ID (ETID) uniquely defining the configured Event Type. It is an advantage of the invention that the repository for an application is structured in this way, since the Business Object Types do not need to know all Aspect Patterns in advance, thus facilitating upgrades of an application.

In a preferred embodiment of the invention a repository is provided further comprising one or more entries of configured pieces of Event functionality within an Aspect Pattern, wherein each of said entries comprises an Aspect Event Type ID. This is an advantage since an Event Type does not need to know of all the Event functionality in the Aspect Pattern in advance.

In the scope of the invention is a repository of the like outline above further comprising: one or more entries of configured Propagated Values; each of said entries comprising a configured Business Object Type ID (BOTID) uniquely defining the configured Business Object Type, a Source Aspect ID ($ATID_1$) and a Target Aspect ID ($ATID_1$). In this way the Aspect Patterns do not need to know each other in advance, since all Aspect Patterns uses the same mechanism for propagating values.

Furthermore, a repository wherein a part of the repository is a database is preferably provided according to may preferred embodiments of the present invention. This is an advantage since currently a database provides for a more structured way of storing data. Preferably each entry is a record in a table, in this way new Aspect Patterns can be added easily.

A system wherein the repository component is a repository as in any of the embodiments explained above is also considered as being within the scope of the first aspect of the invention.

In a third aspect the present invention relates to a method for configuring a Business Object Type comprising the steps of; specifying one or more pieces of functionality within one or more Aspect Patterns, connecting one or more Aspect Patterns with a Business Object Type, connecting one or more Event Type with the Business Object Type, connecting one or more Event Types with one or more pieces of functionality within one or more Aspect Patterns, thereby specifying lending one or more pieces of functionality within the one or more Aspect Patterns to be triggered by the one or more Event Types, whereby a configured Business Object Type is obtained. It is an advantage of the invention that the application developer does not have to follow a predefined order of how: the Aspect Patterns and Business Object Types are connected, the Event Types and the Business Object Type are connected, the Event types are connected with the functionality in the Aspect Patterns, and the specification of the functionality within the one or more Aspect Patterns.

In preferred embodiments of the invention a method is provided, wherein the steps of connecting an Aspect Pattern with the Business Object Type and specifying one or more pieces of functionality within each of the Aspect Patterns are repeated n times is performed. In this way the functionality within the Aspect Patterns is reused. Preferably a method wherein n is a number in the group consisting of (2, 3, 4, 5, 6, 7, 8, 9, 10, 11, 12, 13, 14, 15, 16, 17, 18, 19, 20, 21, 22, 23, 24, 25, 26, 27, 28, 29, 30).

Also within the scope of the invention is a method, wherein one Event Type is connected with one or more one pieces of functionality within one or more Aspect Patterns. This is an advantage since the complexity of an Event Type may vary depending on the application.

In further scope of the invention a method is provided, wherein the step of connecting an Event Type with the Business Object Type is repeated m times. In this way Business Object Instances of the Business Object Type will be able to execute various Event Instances of the Event Types. Preferably m is a number in the group consisting of (2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40).

In other preferred embodiments of the invention the method according to the present invention further comprises the steps of connecting a Relation Aspect Pattern with a first Business Object Type and connecting the Relation Aspect Pattern with a second Business Object Type thereby providing a connection between two Business Object types. This is an advantage since it provides for communication between Business Object Types.

In further preferred embodiments of the invention a method, further comprises the step of specifying a number of meta-data in an Aspect Pattern is provided. In this way the input of data at runtime are defined.

Also within the scope of the invention are methods further comprising the steps of configuring Business Object Type connecting means with a Propagated value mechanism, by configuring Source Value connecting means with Aspect connecting means, thereby specifying where a value should be retrieved from configured Target Value connecting means with Aspect Connecting means, thereby specifying where the retrieved value should be set. In this way propagation of values between Aspect Instances at runtime can be performed. Also, it is ensured that all values configured as target values are updated when the source values change.

Furthermore, the invention has provided methods further comprising the steps of configuring an Aspect Pattern with Rule source connecting means, thereby specifying where a value should be retrieved from and an expression comprising the retrieved value so a value can be calculated and set on the configured Aspect Pattern at runtime. This is an advantage since values on an Aspect Instance that are configured with a Rule only will be updated when needed.

In other embodiments of the invention a method is provided that further comprises a step of storing the Configured Business Object Type in a Repository. Preferably the repository is a repository according to any of the embodiments described above.

In a fourth aspect the present invention relates to a system for running an application, comprising a repository component comprising meta-data of configured Business Object Types, configured Aspect Patterns, and Event Types, a data storage component comprising 1st order data of Business Object Instances, Aspect Instances, and Event Instances, a Business Object Controller (BOC) component handling the propagation of Event Instances between"Aspect Instances. In this way the actual configurations of an application is hold in the repository and the instances hereof are hold in the data storage component. The dynamics are controlled by the BOC. This is an advantage since the Aspect Patterns do not need to know the other Aspect Patterns configurations. Preferably the repository is a repository as described in any of the above-mentioned embodiments.

In preferred embodiments of the inventions system is provided wherein the BOC component further comprises a BO component and an Aspect Pattern Component, the BO component and the Aspect Pattern Component operating in the repository component and the data storage component This is an advantage since the only changes that have to be made in the BOC when a new Aspect Pattern is added will be in the Aspect Pattern Component.

In this and other embodiments of the invention a system wherein the repository component further comprising meta-data for the configured Propagated Values in the Application, and the BOC component further handling the propagation of the configured propagated values is provided. This ensures that all Values on Aspect Instances that have been configured as target values in the Propagated Values are updated when their source values changes.

Within the scope of the invention are systems further comprising a temporary memory for loading data from the repository component and the data storage component. In this way higher performance can be achieved.

In such and further embodiments of the invention a system further comprising an Event Queue is provided. This is an advantage since the Event Queue handles the right order of firing Event Instances when e.g. the Event Instances are fired from a number of Business Object Instances.

In a fifth aspect the present invention relates to a method of running an Application, comprising the steps of firing an Event Instance, the Event Instance comprising an Event Type ID uniquely identifying the Event Type, the Event Instance further comprising a Business Object Instance ID uniquely identifying the Business Object Instance the Event Instance is connected with, submitting the Event Instance to one or more Aspect Instances connected with the Business Object Instance. This is an advantage since only the Aspect Instances need to know how to respond to the fired Event Instance.

In embodiments of the invention the method preferably comprising the step of forwarding the Event Instance to an Event Queue Component, the Event Queue Component handling the order in which the Event Instance has to be fired is provided. This is an advantage since in this way it is ensured that the Event Instances are fired in the right order.

Within the invention is also considered methods wherein the submitted Event Instance is identical to the fired Event Instance.

In such and other embodiments of the invention a method wherein the Event Instance is a user fired Event Instance is provided. In this way a user of an application can trigger one or more pieces of functionality in the Aspect Patterns.

In such and other embodiments of the invention a method wherein the Event Instance is a System fired Event Instance is provided. In this way the application can initiate execution of one or more pieces of functionality within an Aspect Pattern.

Within the invention is also considered methods further comprising the step of setting a value on the Aspect Instance in response to the functionality that has been performed as response to the fired Event Instance. This is an advantage since changes to the Aspect Instance can be added by use of the Event functionality.

In such and other embodiments of the invention a method wherein the propagation of Event Instances between Business Object Instances are based on the configurations of the Relation Aspect Pattern. In this way an Event Instance on one Business Object Instance can trigger one ore more Event Instances on other Business Object Instances, thus enabling communication between one or more Business Object Instances.

In further embodiments of the invention the method further comprising the steps of
1. registering a change in a first Value within an Aspect Instance configured as a Source within a Propagated Value
2. retrieving the first Value within the Aspect Instance
3. setting a second Value on an Aspect Instance configured with Target based on the first value.

In this way it is ensured that values configured as target values in a Propagated Value are updated when their source values changes.

The method according to the present invention may preferably further comprise the steps of handling a rule configured with an Aspect Instance by
1. retrieving a third value within an Aspect Instance configured as a source
2. calculating a fourth value as response to the third value
3. setting the fourth value on the Aspect Instance configured with the rule.

In this way a value on an Aspect Instance configured with a rule is only updated when used.

In such preferred embodiments of the invention a method further comprising the step of: loading data and information and functionality related to the Business Object Instance comprising the BOID and its configured Business Object Type comprising the BOTID in a temporary memory is provided. Preferably a method wherein the step of loading data and information and functionality related to the Business Object Instance further comprises: loading data and information and functionality related to Business Object Instances and their configured Business Object Types related to the Business Object Instance (comprising the BOID) in the temporary memory is provided. In most cases this ensures that all relevant information that may be used in a transaction only has to be loaded from the repository and/or the data storage once.

In such and other preferred embodiments of the invention a method is provided further comprising the step of loading 1.st order data from the temporary memory to the data storage component In this way it is ensured that the data storage component may be updated when a transaction has successfully been executed.

IMPLEMENTATION

In the following an implementation of a systems architecture based on the terms defined above is presented.

Figure 1:
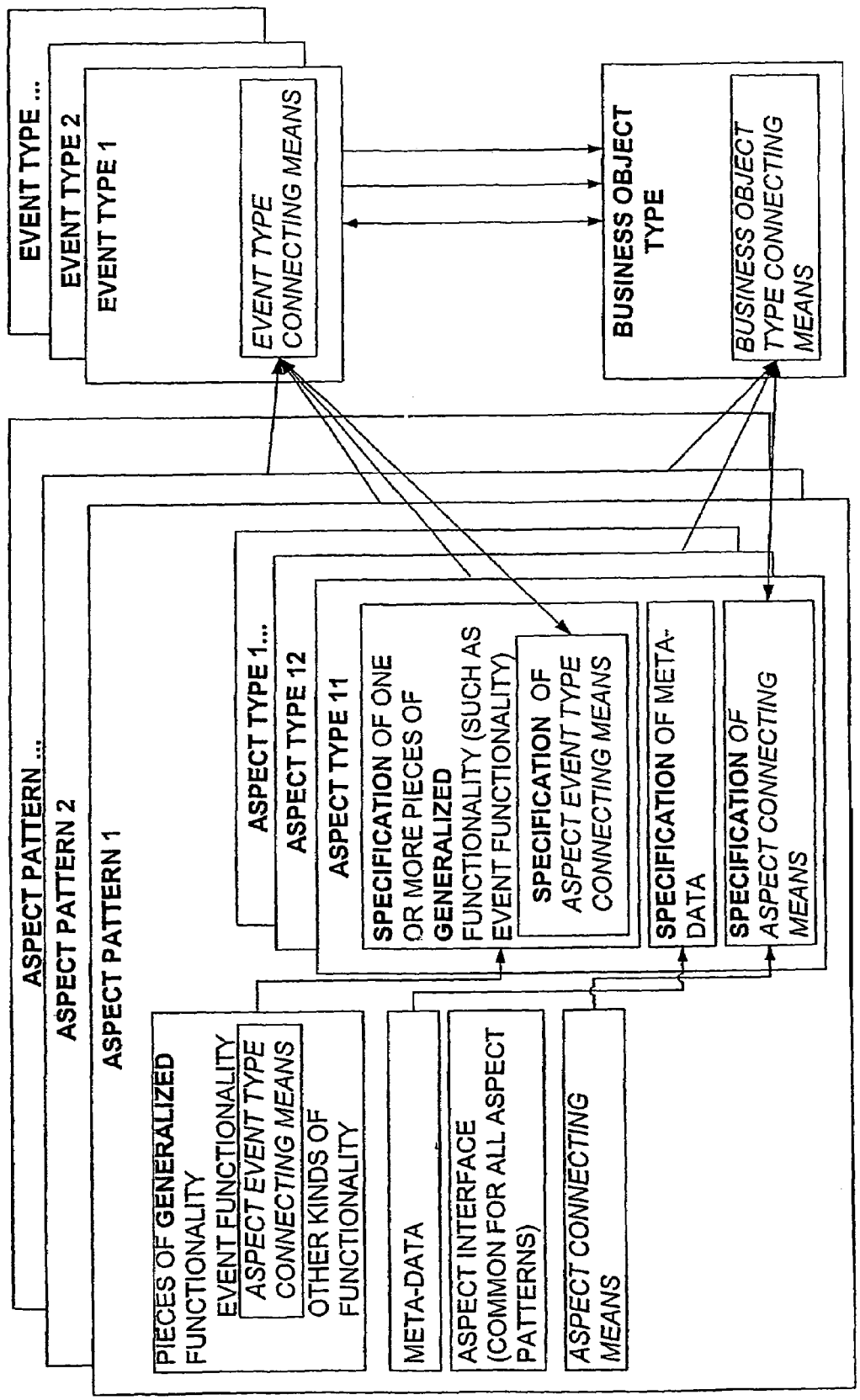
FIG. 1 illustrates a configuration of a Business Object Type based on Event Types, Aspect Patterns and Aspect Types.
Figure 2:
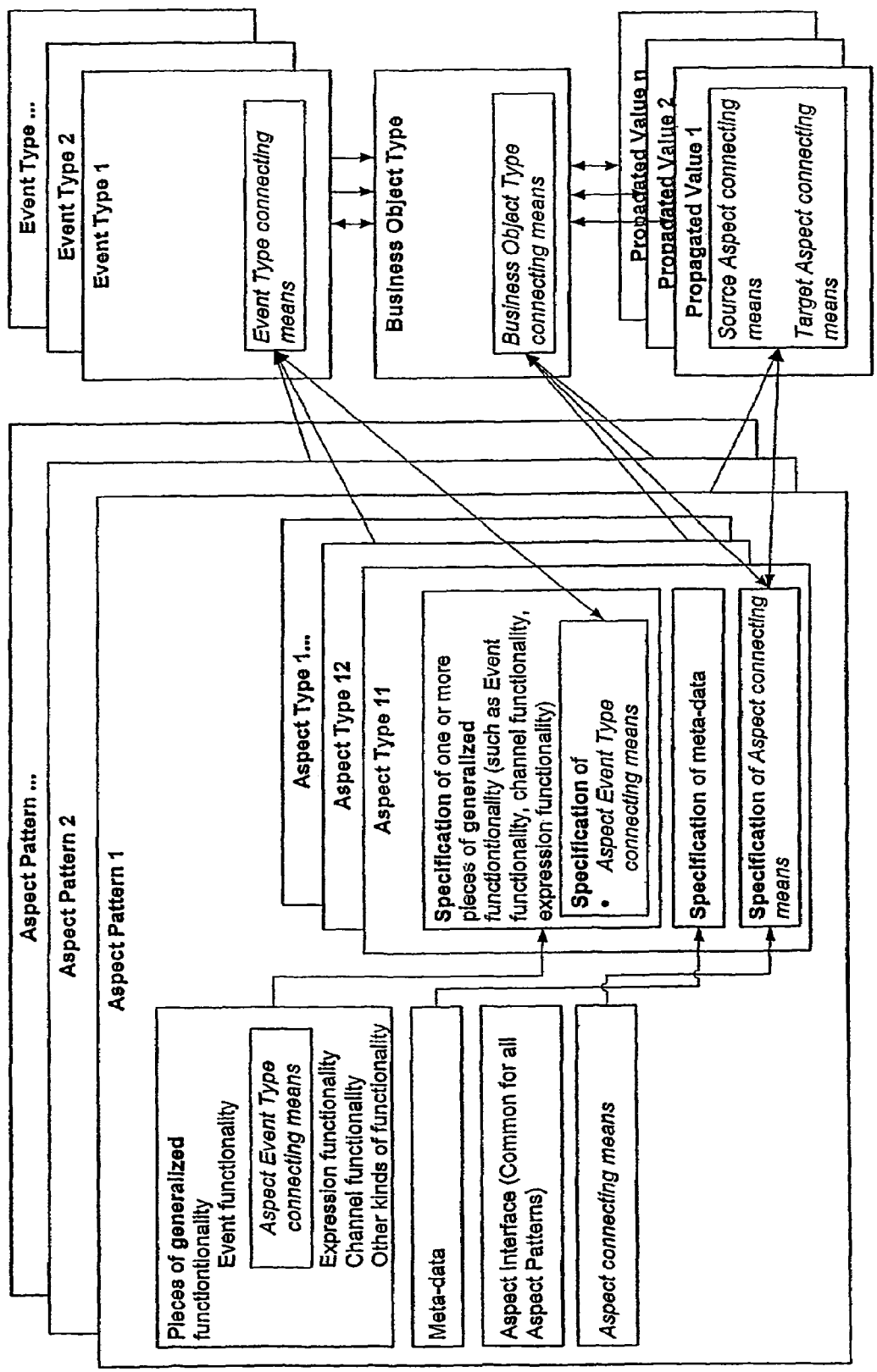
FIG. 2 illustrates a configuration of a Business Object Type as in FIG. 1 further comprising Propagated Values.
Figure 3:
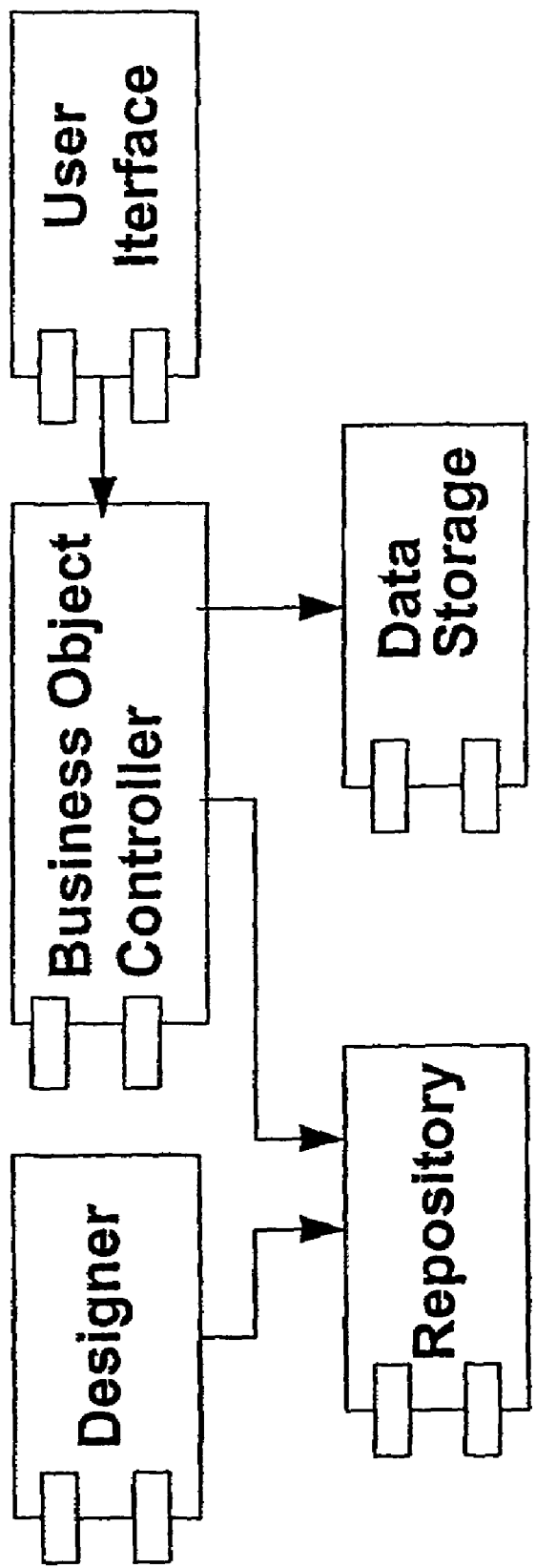
FIG. 3 provides an overview of the components that are used for designing an application as well as of the components that are used for executing an application.

In FIG. 3 the components of the systems architecture are shown. Every Aspect (either as Aspect Instance, Aspect Type, configured Aspect Type or Aspect Pattern) and Business Object (either as Business Object Instance, Business Object Type or configured Business Object Type) exists in each of the components shown in the figure. The figure shows dependencies of components indicated by the arrows (i.e. an arrow that points from one component to another indicates that the first component is using the functionality of the other component).

An application developer may use the Designer component to create an application. The Designer thus presents to the application developer with the elements of the system architecture that may be configured in order to achieve an application.

The user interface presents part of the actual application including runtime data (1st order data) for the end user.

The Repository holds the meta-data of the system i.e. the data of the Aspect Patterns, the Aspect Types, the Aspect Type Configurations, the Business Object Types and the Configured Business Object Types.

The Data Storage holds the 1st order data of an application, i.e. the Business Object Instances made up of Aspect Instances.

The Business Object Controller component controls the business logic of the system i.e., it controls the 1st order data of the system according to the meta-data laid down in the repository. Thus, the Business Object Controller controls the dynamics of the system.

In a preferred embodiment of the systems architecture all data in the repository are stored in a database, but they could just as well be stored in e.g. a file (such as an XML file), which may be an advantage in cases where one or more users of an application do not have permanent access to the database of the application (e.g. in off-line situations) and where it is not feasible to install a relational database on the equipment they use. File-based storage has the advantage of integrating well with source code control systems facilitating scenarios where more than one person is working on the repository in parallel. Alternatively the repository can be stored as executable code.

Figure 4:
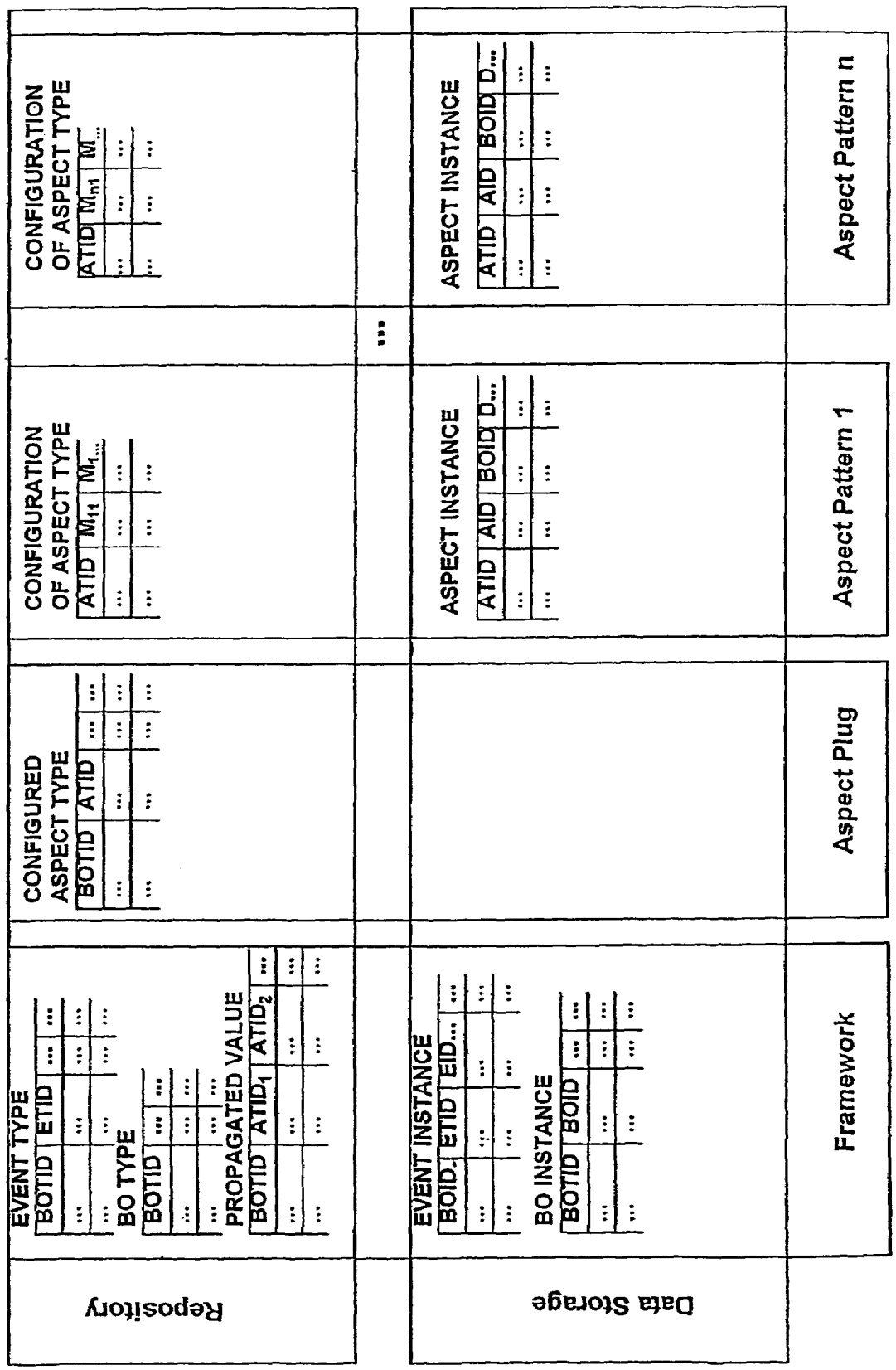
FIG. 4 provides an example of a Database comprising the Repository Component as well as the Data Storage Component.

The layout of an embodiment of the Database comprising the Repository component as well as the Data Storage component is shown in FIG. 4. The Framework part and the Aspect Plug part handles the configured Business Object Types and Business Object Instances. The database further comprises one or more Aspect Pattern parts (Aspect Pattern 1 up to Aspect Pattern n). Each Aspect Pattern part comprises data characteristic for the corresponding Aspect Pattern. The data in the database are split in a Repository part comprising all meta-data, and a Data Storage part comprising 1st order data. Each part comprises one or more tables.

Within the repository part of the database each Aspect Pattern comprises the meta-data specific for this particular Aspect Pattern. Each Aspect Pattern may comprise one or more related tables depending on the structure of the Aspect Pattern's specific meta-data. In the preferred embodiment of the invention the Aspect connecting means is an Aspect Type ID (ATID) that is used to identify the meta-data for a configured Aspect Type in its corresponding Aspect Pattern part Thus, each Aspect Pattern comprises a table of configured Aspect Types for that Aspect Pattern that comprises zero or a number of entries comprising an Aspect Type ID (ATID) and one or more meta-data characteristic for the specific Aspect Pattern.

Each Configured Aspect Type comprises information of which pieces of functionality that may be executed within its Aspect Pattern when an Event Instance of a specific Event Type is received. Also, the configured Aspect Type knows what piece of functionality within the Aspect pattern an Event Instance can be fired from. For this purpose an Aspect Pattern may comprise one or more Aspect Event Type connecting means. In a preferred embodiment of the invention the Aspect Event Type connecting means may be one or more Aspect Event Type IDs ($A_1ETID_1$, $A_1ETID_2$, ..., ..., $A_NETID_1$, $A_NETID_2$ ... (not shown in the FIG. 4)) and the Event Type connecting means is an Event Type ID. The Event Type is then configured with one or more pieces of functionality within one or more Aspect Patterns by making a reference between one or more of the Aspect Event Type IDs with the Event Type ID (ETID). For example, if an address needs to be-checked an Event Type ID "Verify address" can be configured by relating it with the Aspect Event Type ID (e.g. $A_2TID_5$ which in FIG. 4 e.g. could be $M_{25}$) connected with a piece of functionality within an Address Aspect Pattern that verifies an address against a national register. Thus, the configured Address Aspect Pattern has an Aspect Event Type ID (e.g. $A_2TID_5$) "Verify address" referring to the Event Type ID "Verify address".

The repository part of the framework comprises information of all configured Business Object Types and the domain of Event Types for each configured Business Object Type. In a preferred embodiment of the invention the Business Object Type connecting means is a configured Business Object Type ID (BOTID). The repository of the framework part comprises one or more tables comprising all configured Business Object Types in an application, the one or more tables comprising zero or a number of entries with the Business Object Types ID (BOTID). The repository part also comprises one or more tables of all Event Types in the application, the one or more tables comprising zero or a number of entries with a BOTID and an Event Type ID (ETID). The repository part further comprises one or more tables of the Propagated values. The one or more tables comprise zero or a number of entries comprising a Source Aspect ID ($ATID_1$), a Target Aspect ID ($ATID_2$) and a BOTID.

The Aspect Plug comprises information of how the various Business Object Types are configured with the Aspect Types of the various Aspect Patterns. The Aspect Plug in the repository part comprises one or more tables of how all of the Business Object Types in an application are configured with the Aspect Types; these tables comprise zero or a number of entries comprising a Configured Business Object Type ID (BOTID) as well as the configured Aspect Type ID (ATID). For example, if a Business Object Type "Employee" should be created that composes both a "Home Address" as well as an "E-mail address" a Business Object Type shall be configured in the Aspect plug e.g., by making one entry that comprises a BOTID (e.g. "Employee")and an ATID "home address" and another entry that comprises the BOTID "Employee" and an ATID "Email address". The ATID "home address" in the Aspect Plug is referred to by the ATID "home address" within the "Address" Aspect Pattern (e.g. corresponding to Aspect Pattern 1 in FIG. 3), which enables a postal address to be configured. Likewise the ATID "E-mail address" in the Aspect Plug is referred to in the "Address" Aspect Pattern part with the ATID "E-mail address". The actual configurations of the "Home address" and the "E-mail address" in the "Address" Aspect Pattern can then be found in one or more entries in one or more tables referring to the ATID "Home address" respectively "E-mail address".

In a preferred embodiment of the invention the related relation Aspect connecting means of the "Relation" Aspect Pattern is a related relation Type ID. For example, if the "Relation" Aspect Pattern corresponds to Aspect Pattern 1 in FIG. 4 the related relation Type ID could e.g. be $M_{11}$. A relation between two Business Object Types is then configured by configuring a BOTID "1" with an ATID "1" that refers to the ATID "1" in the "Relation" Aspect Pattern and also configuring a BOTID "2" with an ATID "2" that refers to the ATID "2" in the "Relation Aspect Pattern". A relation between the configured Business Object Type identified by the BOTID 1 and the configured Business Object Type identified by the BOTID 2 is then configured by setting the related relation Type ID, e.g. $M_{11}$, to "2" for the entry comprising the ATID "1" and $M_{11}$ to "1" for the entry comprising the ATID "2".

It is an advantage of the Aspect Plug that a new Aspect Pattern can be added to the database without redesign of the database, since the only changes to the layout of the overall Database would be the new Aspect Pattern (Aspect Pattern n+1) and adding standard information about the new Aspect Pattern to the Aspect Plug, thus facilitating upgrades of the system. In a preferred embodiment the standard information about the new Aspect Pattern is added in the Aspect Plug by only adding one line in one table.

One embodiment of the data storage is shown in FIG. 4. The Data Storage part of the database comprises $1^{st}$ order data of an application in one or more tables. The framework part comprises one or more tables of all Business Object Instances of an application and also one or more tables of what Event Instances that have been fired. The actual Aspect Instances are stored in the corresponding Aspect Pattern parts of the Data Storage part in the database.

From the figure it appears that the Data Storage part of the Framework part comprises on or more tables comprising Business Object Instances, the tables comprising zero or a number of entries with the BOTID and the Business Object Instance ID (BOID) of the Business Object Instances of the Business Object Type. The Data Storage also one or more tables of all Event Instances that have been fired, the tables comprising zero or a number of entries with the BOID, the ETID and an Event Instance ID (EID). Each of the Aspect Pattern Parts in the Data Storage comprises one or more Tables of it Aspect Instances comprising zero or a number of the ATID, an Aspect Instance ID (AID) and the BOID. The layout of the Framework is independent of the application, i.e. the Framework would be the same for e.g. a Field Service Management Application and a General Ledger Application.

Figure 5:
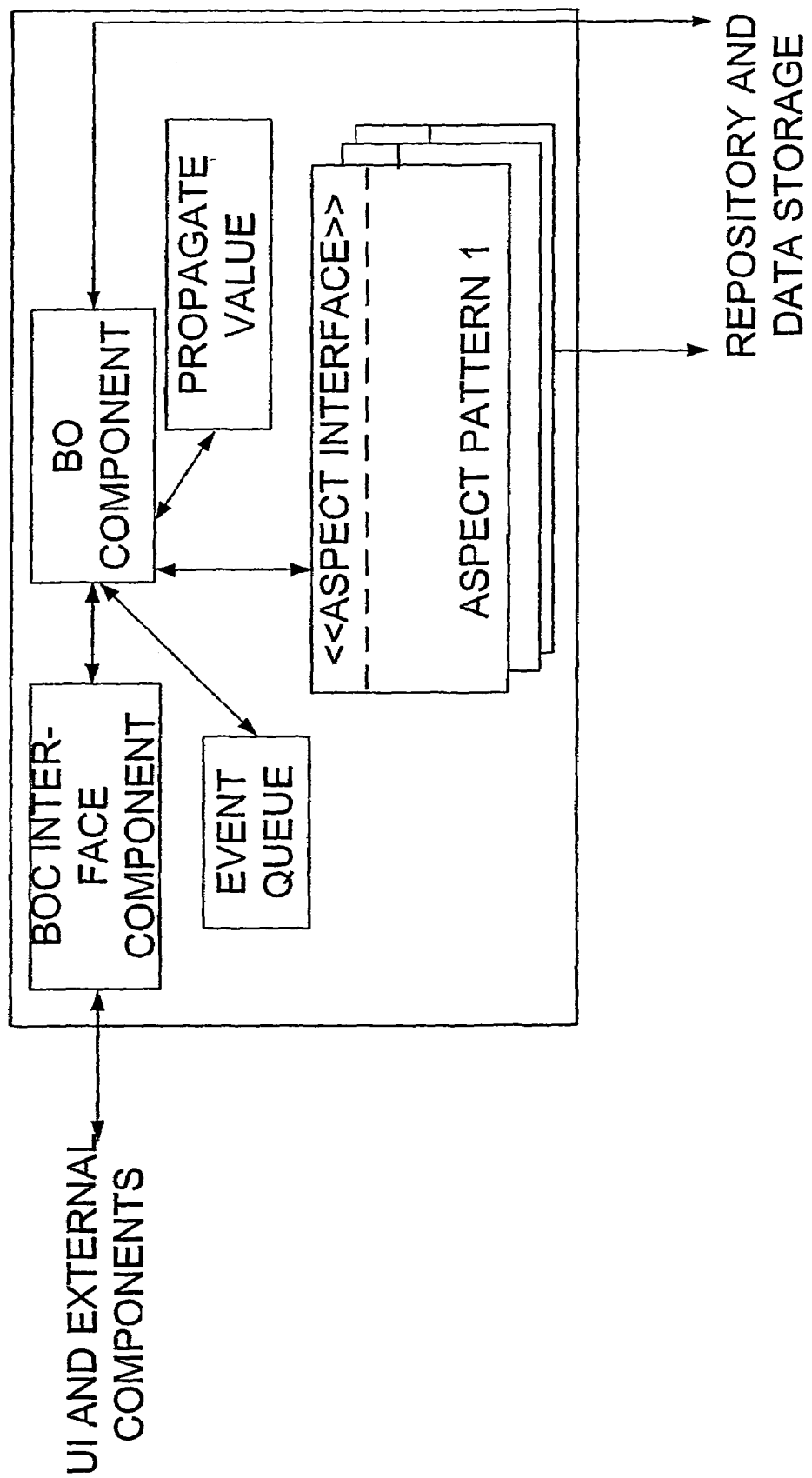
FIG. 5 illustrates the Business Object Controller (BOC).

In FIG. 5 a more detailed outline of the Business Object Controller (BOC is presented. The BOC exchanges documents with external components (such as the UI). It is the BOC Interface Component that handles these operations. In the present systems architecture the BOC is developed in code (such as Visual Basic, C#, Java etc.) and is executed on an application server.

The code that links the meta-data and the 1st order data of the single Aspect Patterns together is comprised in an Aspect Pattern Component i.e., the Aspect Pattern Component reads in the Repository and operates in Data Storage. In the preferred embodiment of the systems architecture the Aspect Pattern Component comprises one component for each of the Aspects Patterns, where each of the Aspect Pattern components implements the same Aspect Interface. This enables the other components of the BOC to interact with any Aspect Pattern Component through its interface without knowing its implementation. This is an advantage since when a new Aspect Pattern is created the only changes that have to be implemented will be in the Aspect Pattern Component. Thus, the BOC can easily be updated when a new Aspect Pattern has to be implemented. The Aspect Interface gives access to such functionality as sending and receiving Event Instances, propagating values through expressions and channels as well as calculating rule expressions.

One of the main functions of the BOC is to control the dynamics of the system. As mentioned earlier the dynamics of the system is managed by Events and propagated Values. For this purpose the BOC further comprises an Event Queue that manages the Events and a propagated value component that manages the Propagated Values. The Events control the dynamics of the Business Objects, i.e. the Event Instances are connected to the actual Business Object Instances (confer FIG. 4). The Event Queue manages the order in which the Event Instances must be fired. The Event Queue sees to that the first incoming Event Instance is the first one to be fired to the specific Business Object Instance. The following Event Instance will not be fired until the first Event Instance has been completed. The Event Queue receives the Event Instances through a Business Object (BO) component comprised in the BOC either received from the Data Storage or sent by an Aspect Pattern Component received from the Data storage, the Event Queue then put the Event Instance in a queue. The BO component takes responsibility for examining the repository to know which Event Types that are configured with which Aspect Types.

Figure 6:
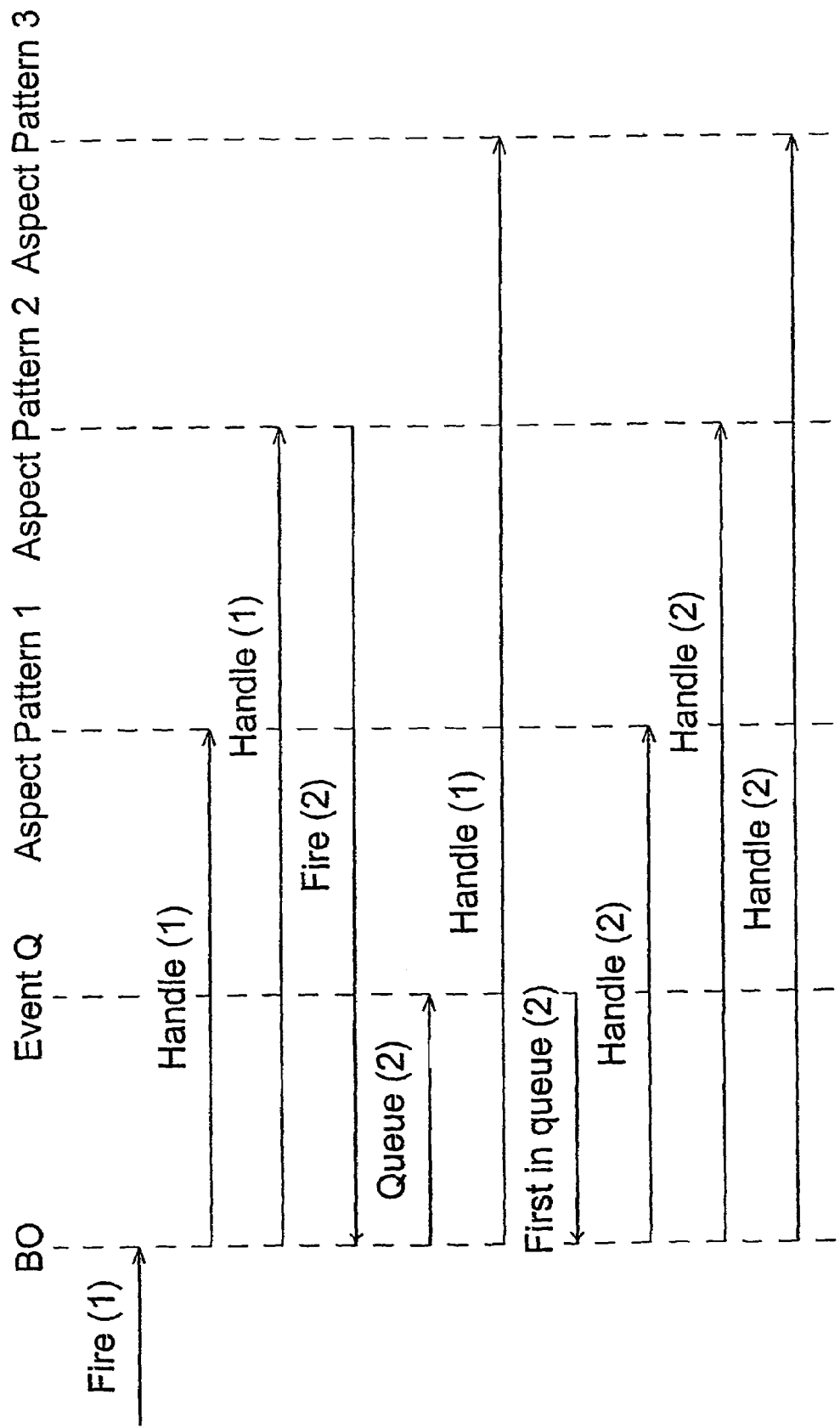
FIG. 6 and FIG. 7 are examples of sequence diagrams illustrating different ways of handling the execution of Event Instances.

When the time has come to fire the Event Instance, the Event Instance is fired to the Business Object component that passes the Event Instance via the Aspect Pattern Interface on to the Aspect Pattern Component. The Aspect Pattern Component then takes care that the Event Instance is fired to the single Aspect Instances within the specific Business Object Instance. The single Aspect Instances then finds out whether it is configured with the Event Type (the Event Instance is an instance of) or not. This is illustrated in FIG. 6. In the figure an Event Instance "1" is fired to the BO component and then on to the Aspect Pattern (component) 1 and afterwards to Aspect Pattern 2. Aspect Pattern 2 then fires an Event Instance "2" as response to "1" to the BO component. The Event Instance "2" is then put in the Event Queue. The BO component continues to pass the Event Instance on to the remaining Aspect Patterns, in this case only Aspect Pattern 3. The Event Queue then passes the first Event Instance in its queue on to the BO component that passes the Event Instance" on to all of the Aspect Patterns.

In another embodiment the Event Instance is only sent to the Aspect Instances that is connected to the Event Instance.

Figure 7:
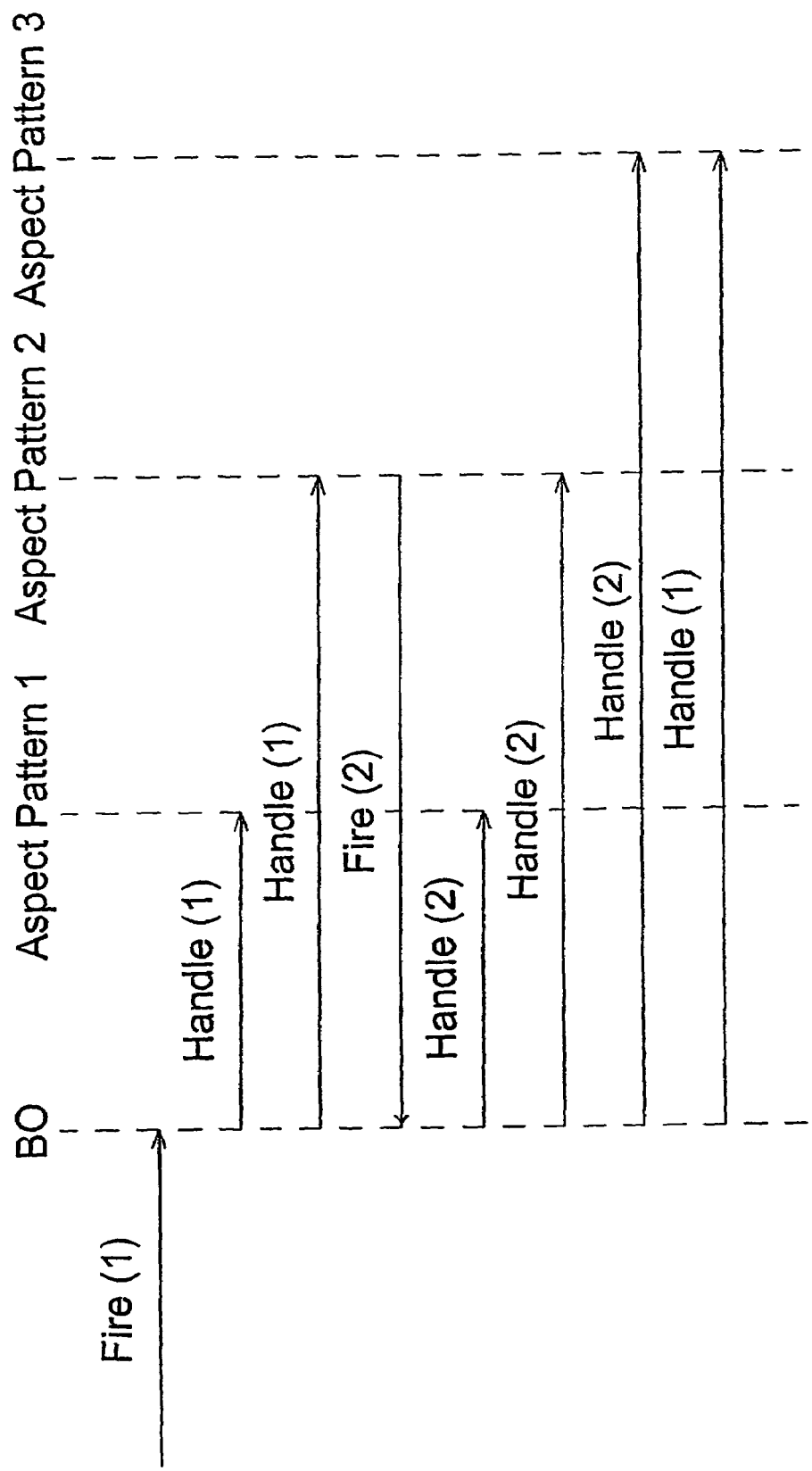

In another embodiment of the BOC the BOC does not comprise an Event Queue. The handling of Events in such a system is illustrated in FIG. 7. In the figure an Event Instance "1" is fired to the BO component. The Event Instance "1" is then passed on to the Aspect Pattern 1 and Aspect Pattern 2. Aspect Pattern 2 then fires an Event Instance "2" in response to the BO component Hereafter the BO component starts passing the Event Instance "2" on to all Aspect Patterns, in this case first to Aspect Pattern 1 then to Aspect Pattern 2 and finally to Aspect Pattern 3. The BO component then finishes handling the Event Instance "1" by firing it to the remaining Aspect Patterns, in this case only to Aspect Pattern 3.

In a preferred embodiment of the invention firing an Event Instance is transactional i.e., unless it is possible to perform the entire process the system will return to the initial state. During the response to an Event Instance an Aspect Pattern may fire another Event Instance, which is then queued until the first Event Instance has responded to all Aspects Patterns of the Aspect Instance configured with the Business Object Instance. The transaction spawned by the original Event Instance, comprises Event Instances fired in reaction to the Event Instance. Likewise for the embodiment of the BOC that does not comprise the Event Queue, the transaction spawned by the original Event Instance, comprises Event Instances fired in reaction to the Event Instance.

Whenever a transaction is initiated a copy of all entries that comprises information about the one or more Business Object Instances is loaded in the BOC. That is, all related Business Object Instances, which are used in the current transaction is loaded. When a Business Object Instance is loaded all relevant information is also loaded this may e.g. include, configured Business Object Types, Event Types, configured Aspect Types, and Propagated Values, Business Object Instances and Aspect Instances, Event Instances. Propagating a value is part of a transaction.

Figure 8:
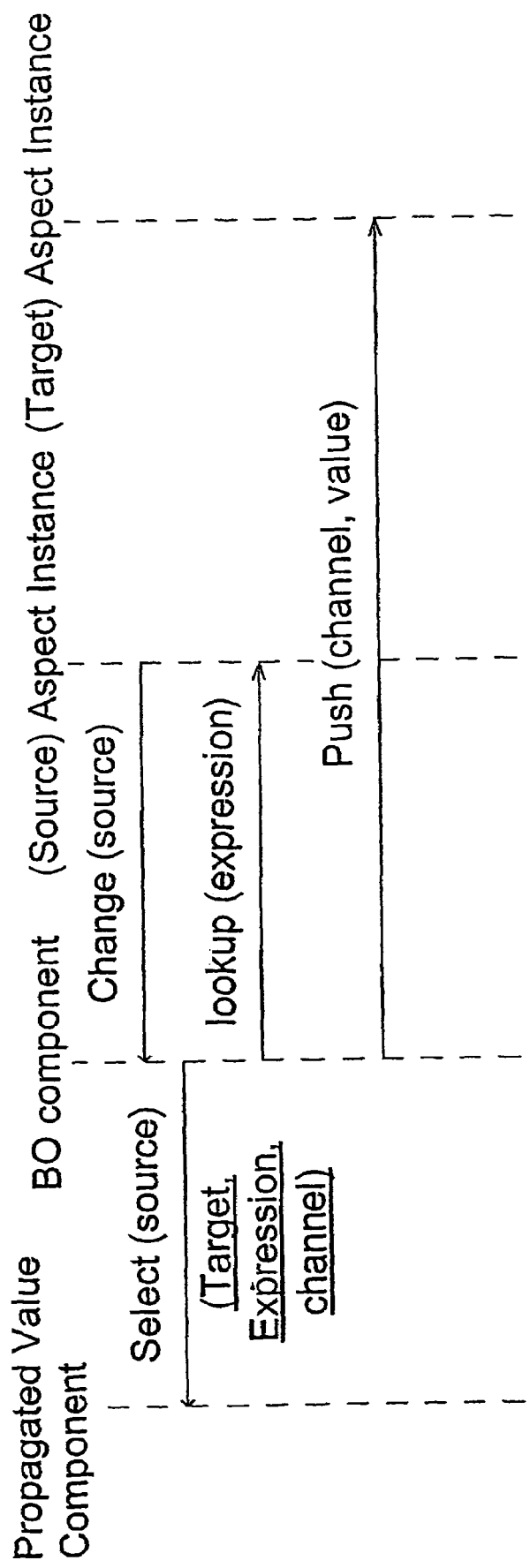
FIG. 8 is a sequence diagram illustrating how the Propagated Value mechanism works.

In FIG. 8 the process of propagating a value is illustrated. When an Aspect Instance is changed a message is send to the BO component in the BOC (the BOC is illustrated in FIG. 5). The BO component then passes on a message to the Propagate Value component that comprises information of what Aspect Instance that is changed. The Propagated Value Component then finds all Aspect Instances that are targets for this change if any and returns the identification of these Aspect Instances to the BO component The BO component then pushes the values from the source Aspect Instance on to the target Aspect Instances.

Figure 9:
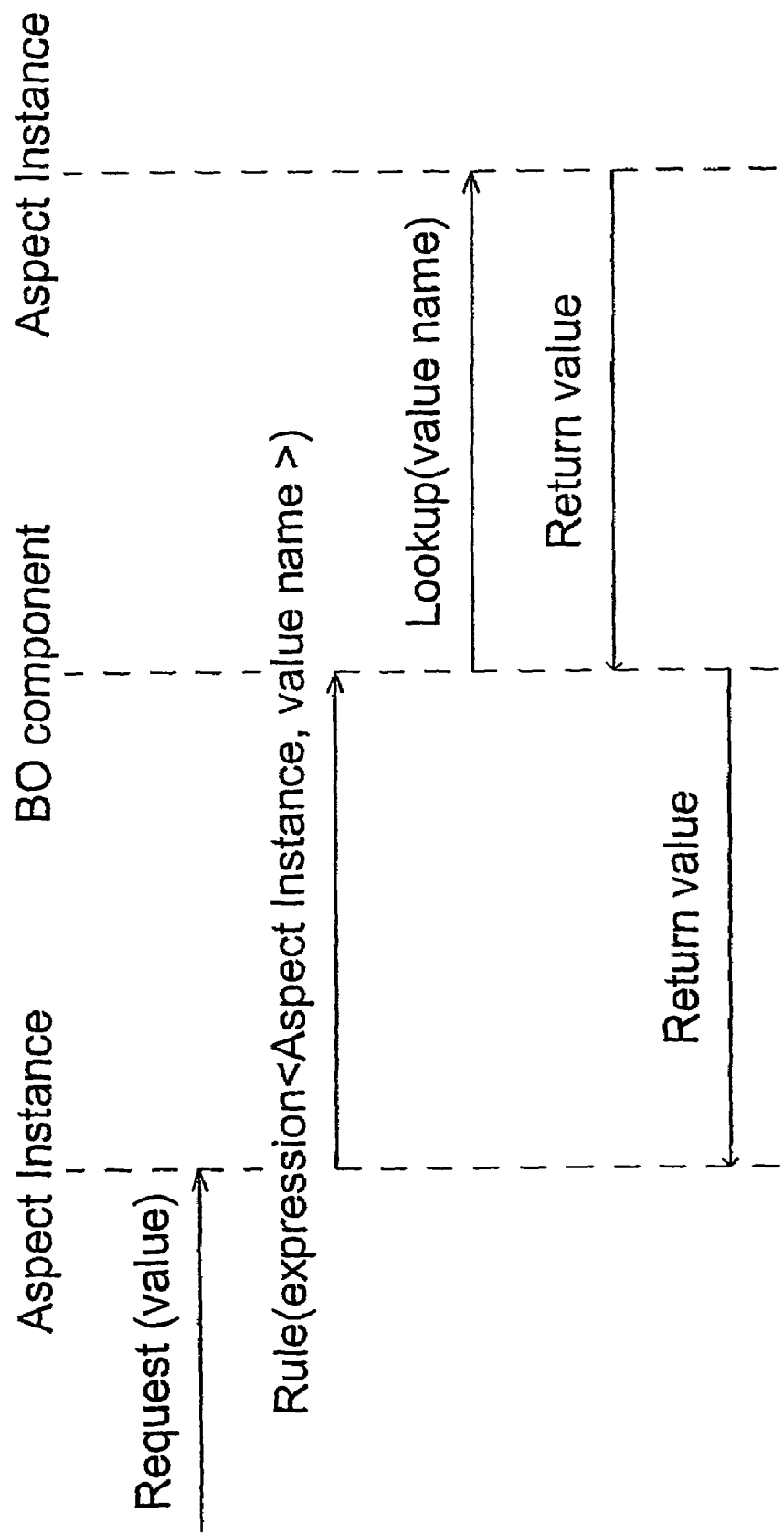
FIG. 9 is a sequence diagram illustrating how the Rule mechanism works.

In FIG. 9 the process of calculating a rule is illustrated. When value on an Aspect Instance is requested, a message comprising information about the expression to be calculated and where the one or more values should be looked up, is sent to the BO component in the BOC (the BOC is illustrated in FIG. 5). The BO component then sends a message to the Aspect Instance to lookup the value with the value name. The Aspect Instance hereafter returns this value to the BO component. The BO component calculates the expression and returns calculated value to the Aspect Instance.

The invention claimed is:

1. A computer system having processor configured to run art application program, comprising:
   a first store storing aspect pattern metadata associated with a plurality of aspect patterns and object type metadata associated with a plurality of object types, the aspect patterns implementing functionality for the object types and the aspect pattern metadata and object type metadata describing connections between the aspect patterns and the object types wherein the first store also stores event metadata associated with a plurality of event types;
   a second store storing aspect pattern instances of the aspect patterns and object instances of the object types wherein the second store stores event instances of the event types;
   an object controller controlling interaction between the object instances and the aspect pattern instances based on the aspect pattern metadata and object type metadata wherein the object controller comprises:
      an object component configured to receive event instances and provide the event instances to the aspect patterns based on the event metadata;
      an aspect pattern component implementing an aspect pattern interface through which the object component passes event instances to the aspect patterns; and
      an event manager component receiving the event instances and managing an order in which the event instances are provided to the object component.

2. The computer system of claim 1 wherein the first data store stores propagated value metadata associated with a plurality of propagated values.

3. The computer system of claim 2 wherein the propagated value metadata identifies a source aspect pattern and a target aspect pattern for each propagated value, the source aspect pattern being an aspect pattern from which the corresponding propagated value is to be retrieved and the target aspect pattern being an aspect pattern to which the propagated value is to be delivered.

4. The computer system of claim 3 wherein the object controller further comprises:
   a propagated value component coupled to the object component and identifying target aspect patterns for source aspect patterns provided to the propagated value component from the object component.

5. The computer system of claim 4 wherein the object component is configured to push the propagated value to the target aspect patterns identified by the propagated value component.

6. The computer system of claim 5 wherein the object component is configured to receive from a requesting aspect pattern instance a rule expression indicative of a calculation to be performed on a value, and a source identifying a source aspect instance from which the value is to be retrieved.

7. The computer system of claim 6 wherein the object component is configured to obtain the value from the source aspect instance and perform the calculation using the value to obtain a new value.

8. The computer system of claim 7 wherein the object component is configured to return the new value to the requesting aspect pattern instance.

* * * * *